Our invention relates to a heterogeneous nuclear reactor of the pressure vessel type which is cooled and moderated with water at supercritical pressure and supercritical temperature and wherein coolant and moderator are maintained at the same pressure as is present in the pressure vessel.

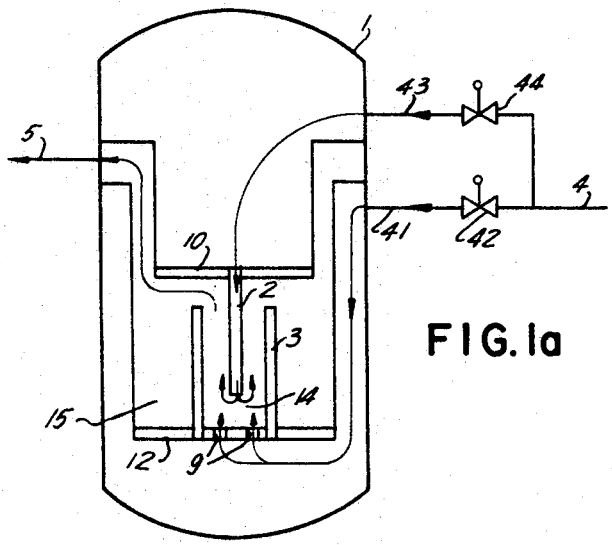
FIG. 1a
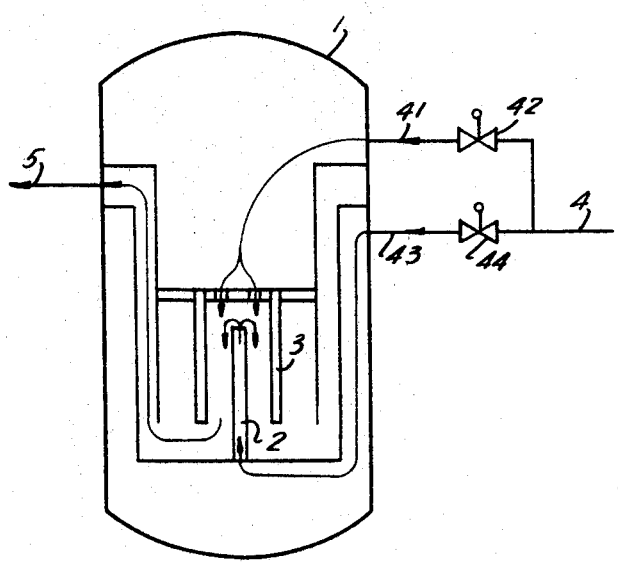
FIG. 1b
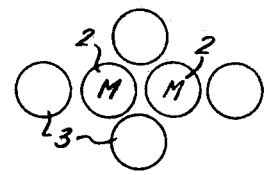
FIG. 3a
FIG. 3b
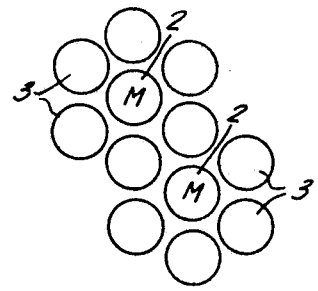
FIG. 3c
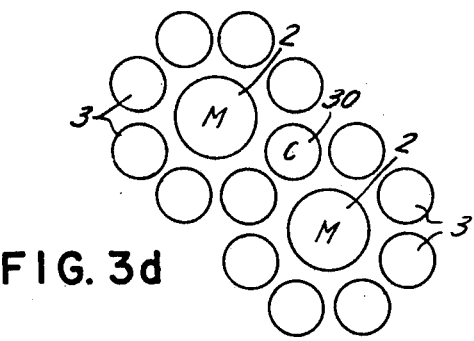
FIG. 3d 3,392,087
HETEROGENEOUS NUCLEAR REACTOR OF THE
PRESSURE VESSEL TYPE
Wolfgang Braun and Franz Winkler, Erlangen, Germany, assignors to Siemens Aktiengesellschaft, a corporation of Germany
Filed Aug. 6, 1965, Ser. No. 477,733
Claims priority, application Germany, Aug. 8, 1964, S 92,534
13 Claims. (Cl. 176—56)

In the field of nuclear reactor engineering there is a constant striving to obtain ever greater pressures and temperatures of the steam produced with water-cooled and water-moderated nuclear reactors and thereby also achieve greater efficiencies. Due consideration has accordingly been given to operating such reactors with water in supercritical state. Such supercritical boiling water reactors are generally planned or designed as so-called pressure tube reactors, that is, as reactors wherein the coolant which is under high pressure is conducted through tubes which separate the coolant from the generally non-pressurized moderator.

It is accordingly an object of our invention to provide in a water-cooled and water-moderated heterogeneous nuclear reactor, a reactor core which affords an improved and increased efficiency in the operation of such reactors. It is a further object of our invention to provide a reactor core with means other than control rods for regulating the reactivity thereof.

With the foregoing and other objects in view and in accordance with our invention, we provide a nuclear reactor core of fuel elements or rods arranged in the form of a grid or lattice, a similar lattice-like distribution of moderator elements being inserted intermediate the fuel rods. The lattice-like moderator elements are in tubular form and simultaneously serve as supply means for part or all of the cooling water and for regulating control valves located in the supply lines of the coolant and the moderator, in addition to the known control rods. Permanently adjusted throttle or choke elements are also located in the moderator tubes.

The flow traversal of the reactor core by the coolant thus takes place in accordance with counterflow principles: at first the portion of the coolant flow passing through the moderator tubes acts as moderator. After this flow portion discharges from the moderator tubes, it is reversed, is mixed with the remaining coolant flow supplied there into the reactor core and then flows in the opposite direction along the fuel rods. The coolant flow is thus heated by heat transfer from the fuel rods so that the heat transferred from the coolant, for its part, through the walls of the moderator tubes to the moderator flow portion within the moderator tubes is capable of varying the density thereof. The moderator elements are therefore nothing more than light supply tubes without any kind of heat insulation. Pressurewise they are only stressed by the resulting resistances to flow. As mentioned hereinafter in greater detail, this basic construction of the reactor core produces automatic control and automatic stabilization of the entire reactor.

Other features which are characteristic for the invention are set forth in the appended claims.

Although the invention is illustrated and described herein as embodied in heterogeneous nuclear reactor of the pressure vessel type, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

FIGS. 1a and 1b are schematic views of different embodiments of the reactor core;

FIGS. 3a to 3d are schematic views of grid cross sections of the fuel rods and moderator elements in the reactor core;

Figure 2A:
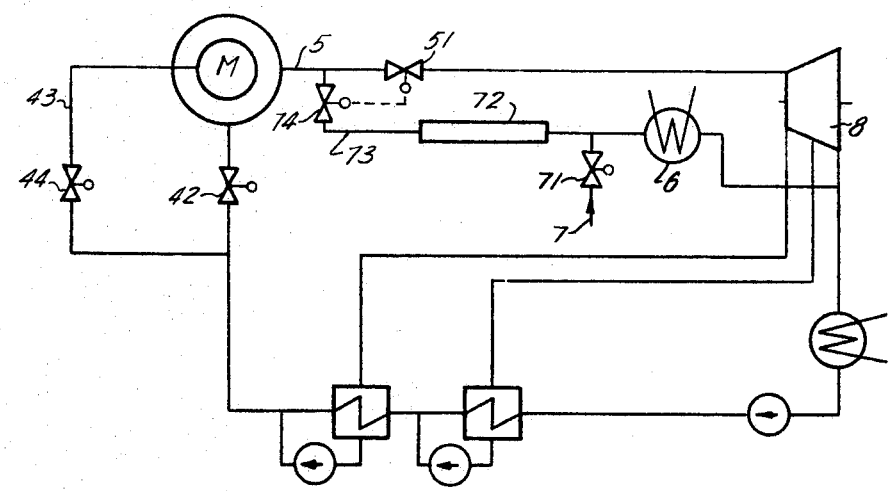
FIGS. 2a and 2b are diagrammatic views respectively of open and closed circuits for the coolant of the reactor.

Referring now to the drawings and first particularly to FIGS. 1a and 1b thereof, there is shown diagrammatically in FIG. 1a the basic construction of the reactor core which for the purpose of clarity is shown with only one moderator element 2 and two fuel rods 3. It is naturally understood that a reactor core proper contains many more of such structural elements.

The reactor core, as aforementioned, is located within a pressure vessel 1 and is provided with the moderator tube 2 and fuel rods 3. A coolant 4 flows through the conduits 41 and 43 into the reactor vessel under a pressure of 250 to 300 atm. A control valve 44 is inserted in the conduit 43 for controlling the supply of coolant that is to act initially as moderator; a control valve 42 is inserted in the conduit 41 for controlling that portion of the supply of coolant that is fed directly to the fuel elements. The coolant from the conduit 43 flows first into the moderator tube 2, discharges therefrom at the free end thereof and flows together with the coolant from the conduit 41 along the fuel rods 3 in an upward direction as viewed in FIG. 1a and discharges through the conduit 5 from the reactor pressure vessel 1.

In the embodiment shown in FIG. 1b, the arrangement of the fuel rods and moderator tubes is the reverse of that of the embodiment in FIG. 1a; however, the flow path of the coolant and of the moderator is generally the same as that of FIG. 1a.

Figure 2B:
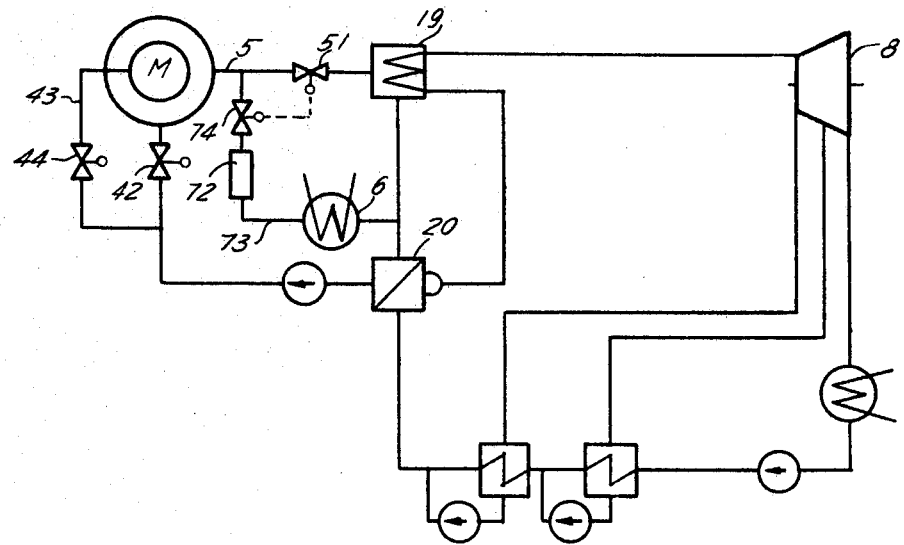

The outer loop of the coolant is shown as an open circuit in FIG. 2a, that is, for direct supply to the turbine 8, and for a closed circuit in FIG. 2b, that is, through the interposition of heat exchangers 19 and 20. Shielding devices, thermal shields and the like, are not shown in FIGS. 2a and 2b for the purpose of affording a clear view and avoiding obliteration of any detail.

In contrast to the conventional water-cooled reactors wherein the increase of specific enthalpy of the coolant in the reactor is only up to substantially 50 kcal./kg., the increase of specific enthalpy in a reactor operated with water at supercritical pressure and temperature must be about 10 times that amount, because the coolant is brought to its final temperature in one pass through the reactor core. The coolant throughput is consequently smaller. Nevertheless, in order to achieve a flow velocity of the coolant along the fuel rods suitable for a good heat transfer, the coolant channel cross-section must be kept relatively small. Add to this the fact that because of the supercritical temperature and therewith the low density of the coolant water in the coolant channels, a subdivision of the water space into a hot coolant portion and a colder moderator portion more suitable for neutron physics requirements is necessary in order to obtain an optimum volume relationship between water and uranium as well as a high specific liter or volume capacity in the reactor core. Both of these necessary features are furnished by the moderator tubes and the coolant cross-section as well as the grid cross-section between fuel rods 3 and moderator elements 2 as shown in FIGS. 3a, b and c. Thus the smallest coolant cross-sections for a given ratio between moderator and fuel cross-sections results from the hexagonal grid and the octagonal grid of FIGS. 3c and 3d respectively. The ratio of both of these cross-sections then lies substantially in the order of magnitude of 1:1. It ought to be noted at this point that the reactor core is assembled from a uniform grid of such types of fuel rods and moderator elements which can be secured to suitable upper and lower grid holder or support plates as is known from the conventional reactor technology. Known structural elements can be employed for the intermediate mutual spacer support plates. Naturally it is also possible, for the purpose of facilitating the interchangeability or replaceability of individual fuel rods, to distribute fuel elements over the entire reactor core which can have the familiar geometrical forms in cross section that have been known heretofore in the field of reactor engineering. In a case where the reactor core is formed of individual fuel elements, it must be again noted that these fuel elements are in turn formed of a great number of fuel rods and grid-like moderator elements intermediate thereto and arranged according to the aforementioned principle. For both variants, that is for a unitary reactor core and for the reactor core of individual fuel elements, naturally the same coolant flow-through principle governs so that the same operating characteristics are also to be anticipated.

These operating characteristics result from the following phenomena: the moderator which subsequently acts as coolant comes out of the conduit 43, flows into the upper collection chamber (FIG. 1a) of the reactor pressure vessel 1 and flows therefrom into the moderator tube 2 secured at the upper grid holder plate 10. The moderator consequently is heated by the hot coolant flowing counter thereto on the outside of this tube 2. The hotter water flowing out of the moderator tube 2 mixes with the coolant entering through the bores 9 in the lower holder plate 12 from the conduit 41 connected to the reactor pressure vessel 1. The coolant water mixed with the moderator fluid at the inlet of the coolant channel 14 which has a temperature of about 280–300° C. is then heated to substantially 500° C. by flowing about the fuel rods 3. The water emerging from the coolant channel 14 is conducted at the other end of the fuel rods 3 in a radial direction to an annular collection space 15 which is connected with the outlet tube 5 of the reactor vessel. These flow relationships are also present in a closed or unitary fuel element as shown in cross-section in FIG. 4. A fuel element of this latter type includes, in addition to structural elements of the moderator tube 2 and fuel rods 3 additional elements such as spacer holders or supports 31 and carrying elements 32 for securing the upper and lower rod holder plates 10' and 12', respectively, as well as an outer baffle plate 33. Choke or throttling means 21 are readily seen in the diagrammatically illustrated embodiment of FIG. 4.

The automatic regulating characteristics of a reactor of such construction is illustrable as follows: the more the water under pressure flowing through the moderator tubes is heated by heat transfer from the outer warmer coolant water through the walls of the moderator tubes, the smaller is the moderator fluid throughput. If the moderator fluid throughput is adjusted so that the average moderator temperature lies in the vicinity of the critical temperature, each throughput variation produces a relatively large density variation in the moderator fluid, since in the vicinity of the critical temperature, the density of the water varies very greatly, i.e. substantially by a factor of 10. A large density decrease of this type, however, produces a correspondingly great decrease in moderation which in turn effects a shift in the neutron spectrum and therewith a decrease in reactivity. A decrease of reactivity however produces a smaller reactor output and therewith again a decrease in the temperature in the moderator and an increase in the density thereof, so that an adjustable condition can be regulated continuously by means of the moderator control valve 44. These phenomena are even further increased by throttle or choke elements 21 firmly built into the moderator tubes. The operation thereof takes place as follows.

If the power density increases in the fuel rods of a fuel element or even only in a portion of the rods, the coolant temperature in the coolant channel then increases and consequently the heat transferred to the moderator through the moderator tubes as mentioned hereinabove is also increased therewith. This leads to an increase of the moderator temperature inside the moderator tube and therewith to an increase in the specific volume of the moderator fluid. The increased specific volume of this moderator fluid produces a high flow velocity, however, and consequently a greater pressure loss at the choke 21. The decrease in throughput of the moderator tube therefore follows the relationship $$\dot{G} = F \cdot \sqrt{\frac{2g\Delta p}{\xi \cdot v}}$$

and so on, wherein $\dot{G}$ = the moderator throughput, $F$ = the cross section of the choke passage, $g$ = gravity (9.81 m.·sec.$^{-2}$), $\Delta p$ = the working pressure difference (provided by the coolant pump), $\xi$ = the coefficient of resistance of the choke, and $v$ = the specific volume. The decrease in throughput which is determinable by means of the foregoing formula thereby effects a further increase in the moderator temperature and therewith an additional decrease of the moderating density in the fuel element. Due to this decrease in the moderating density, the neutron flux and therewith the power density in the fuel element and in the adjacent fuel elements decrease once again. The control circuit automatically operating therewith: fuel rod power output—coolant temperature—moderator temperature—decrease in throughput—moderator density—neutron flux density—power density—leads to a new equilibrium condition in which the original local, excessively increased power density is adjusted to the power density of the neighboring or adjacent zones. The remaining control tolerance or deviation and the stability of the control circuit are very greatly determined by the construction of the moderator choke and by the location of the moderator temperature operating point with reference to the critical temperature.

The built-in chokes therefore effect a levelling or flattening of the flux curve in addition to reducing the local power peaks. This automatically obtained flattening of the power density distribution curve, when considered over the reactor cross-section, can be even further strengthened by providing less throttling at the expected locations of lower power density and greater throttling at the locations of higher power density. In this connection it ought to be pointed out that not only is flux flattening in the radial direction made possible by this new form of the reactor but rather, due to the temperature and density distribution in the moderator fluid in the axial direction the greatest density is present at both of the reactor ends so that an axial flux flattening is also achieved. This extensive flattening or levelling of the radial and axial power density distribution is also favorable for the load carrying capacity of the fuel rods because different fuel rod outputs particularly for the aforementioned high temperatures of the coolant can lead to great temperature differences at the ends of the coolant channels.

Summarizing then, the variation in the moderator throughput by means of the externally located control valve as well as the installation of the choke elements in the moderator tubes renders feasible:

(1) Regulating the output as well as relieving the control rods during a power variation;

(2) Compensating an excursive reaction;

(3) Reducing the number of regulator rods that are required;

(4) Changing the conversion or breeding ratio of a reactor; and (5) Producing an automatic flattening of the radial and axial power density distribution curve as well as reducing local power peaks in the reactor core, especially with the aid of the chokes located in the moderator tubes either at the end of the moderator tube or at locations of lower moderator density for strengthening the sensitivity of response.

Figure 5:
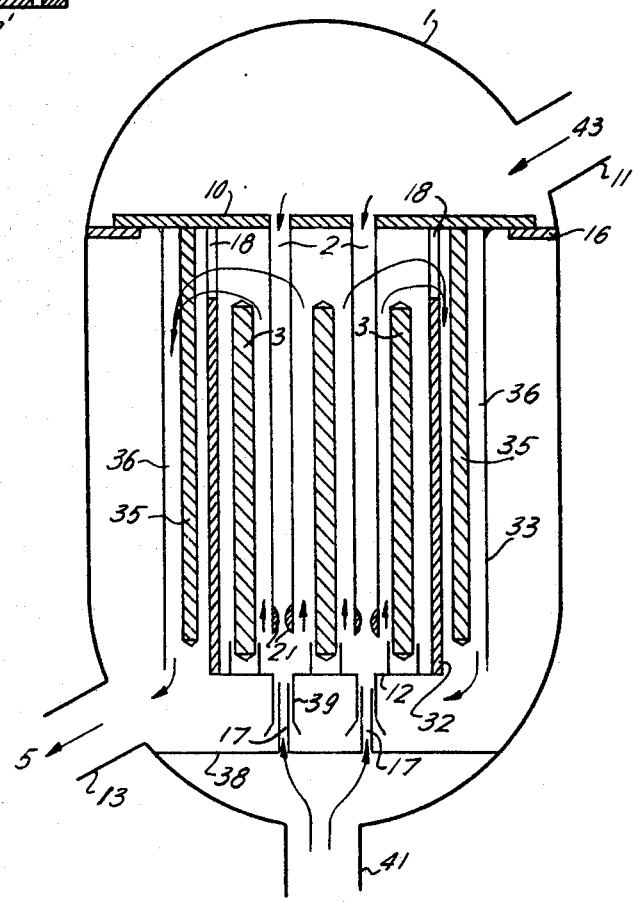
FIG. 5 is a longitudinal section partly diagrammatic of a single fuel element in final assembly in the reactor core.

Besides the aforementioned resulting actions, a further equalization of the temperature difference between the individual cooling water flows or currents over the cross-section of the reactor core is achieved by providing a mixing chamber that extends over the entire core cross-section. Such an additional construction is shown in FIG. 5 in a schematic cross-section of an individual fuel element. The fuel element is mounted with its upper holder plate 10 supported on an annular flange or shoulder 16 of the reactor vessel 1 and connects by means of the connecting tube 39 at the lower holder plate with the supply connecting pipes 17 extending upwardly from the partition 38 of the lower coolant collection chamber. As described hereinabove, the coolant flowing in through these connecting pipes 17, 39 mixes with the previously heated moderator fluid flowing out of the moderator tubes 2, then ascends along the fuel rods 3, is heated further and thereby reaches the supercritical state. In the space above the fuel rods 3, the supercritical coolant currents can intermix and can subsequently pass through the upper openings 18 of the structure 32 supporting the lower holder plate 12. The fluid mixture then flows along the "superheater" fuel rods 35 in the channel formed by the guide or baffle plate 33 in a downward direction and is passed through the vessel connecting tube 13 to provide the working medium for the turbine 8 (FIG. 2a) or the heat transferring medium therefor (FIG. 2b). The cross-section of such a fuel element can be square-shaped for example so that the superheater channels and the fuel rods 35 lie at the corners thereof. Due to the higher temperatures, the fuel rods 35, circumstances permitting, must be made of other more temperature-resistant materials than that of the fuel rods 3.

It is apparent that a reactor of this type, when being started up and shut down, experiences an unusually large change in reactivity due to the great change in density of the water which cannot be compensated or equalized under the circumstances by conventional control rods alone. It is therefore suggested to intermix with the coolant water during shut off and start up of the reactor a fluid neutron absorber such as boric acid for example. Since the coolant containing the absorber should not be released into the turbine, it is made to by-pass the turbine 8 (FIG. 2a) or the heat exchanger 19 (FIG. 2b) through an auxiliary or intermediate cooler 6 during the start up and shut down periods. The indicated valves 51 and 74 shown in FIGS. 2a and 2b switch over the flow path to by-pass the turbine 8 or heat exchanger 19, as the case may be. The conduit 73 bridging over or by-passing the turbine 8 or heat exchanger 19 passes through a purifying device 72 which, during start up of the reactor, removes, from the coolant of increasing temperature, the absorber mixed therewith, so that when the turbine 8 or heat exchanger 19 is cut into the circuit, that is when the valves 51 and 74 are switched over, i.e. by opening the valve 51 and closing the valve 74, no boric acid is present anymore in the coolant supplied thereto. From this instant on the automatic regulation is also fully operative. The conduit 7 shown in FIG. 2a with the valve 71 serve to supply the absorber into the coolant circuit when the reactor is shut off. The by-pass conduit 73 with the auxiliary cooler 6 can naturally be employed for cooling the reactor in the case of a sudden shut down of the turbine as well as for carrying away the heat following the disintegration in the reactor. Supplying the absorbant through the conduit 7 furthermore permits the reactor to be turned off in the event the inserted control rods fail or prove to be insufficient for controlling the reaction.

Figure 4:
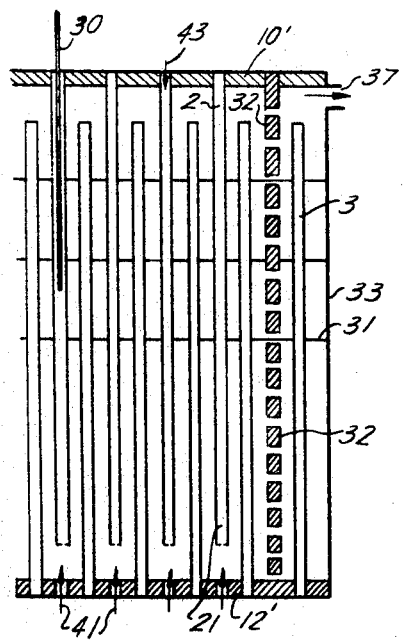
FIG. 4 is a longitudinal sectional view partly diagrammatic of a self-contained fuel element.

Besides the aforementioned possibilities for controlling the reactor, control rods can naturally also be inserted in addition thereto. These can be located in a conventional manner in spaces intermediate the fuel elements, but also, for example, extending into the moderator tubes and thereby, in addition to the normal absorption effect, can also produce an additional choking effect which for its part again reduces the neutron flux at the respective location in the manner mentioned hereinbefore. Control rods can naturally also be installed at the fuel rod locations whereby with the aforementioned reactor core construction especially also the insertion of finger control rods (the absorber fingers can accordingly be located both in the fuel rod positions as well as in the moderator tube positions) can be suitable. In most cases the moderator fluid or coolant fluid flowing by can be used for cooling the absorber rods. A control rod 30 inserted in a moderator tube 2 is shown in FIG. 4 and a control rod 30 substituted for a fuel rod 3 is shown in FIG. 3d. A control rod 30 located in the space intermediate the fuel rods 3 is shown in FIG. 3b. It is also to be noted that light water is preferred as coolant yet, however, other situations are conceivable in which heavy water or a mixture of heavy and light water for a correspondingly suitable geometric shape of the reactor core may be practical.

We claim:

1. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, supply tube means connected to said moderator tubes for supplying at least a portion of fluid coolant to said fuel rods through said moderator tubes, regulating valve means for controlling the reactor in addition to the control rods, said regulating valve means being connected in said supply tube means, and throttling means located in said moderator tubes.

2. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, coolant flow channel means extending along the length of said fuel rods substantially parallel to said moderator tubes, supply tube means connected to an end of said moderator tubes and to an end of said flow channel means located opposite said end of said moderator tubes for passing to said fuel rods a portion respectively of fluid coolant through said moderator tubes and said flow channel means in counter-flow directions, regulating valve means for controlling the reactor in addition to the control rods, said regulating valve means being connected in said supply tube means, and throttling means located in said moderator tubes.

3. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, coolant flow channel means extending along the length of said fuel rods substantially parallel to said moderator tubes, supply tube means connected to an end of said moderator tubes and to an end of said flow channel means located opposite said end of said moderator tubes for passing to said fuel rods a portion respectively of fluid coolant through said moderator tubes and said flow channel means in counterflow directions, said fuel rods and said moderator tubes being distributed in grid-like arrangement over said reactor core so as to provide a minimum ratio between the cross sectional area of said coolant flow channel means and the cross sectional area of said moderator tubes and a ratio of the cross sectional area of said moderator tubes to the cross sectional area of said fuel rods that is greater than one, regulating valve means for controlling the reactor in addition to the control rods, said regulating valve means being connected in said supply tube means, and throttling means located in said moderator tubes.

4. In a heterogeneous nuclear reactor of pressure vessel type controlled by control rods and moderator and cooled with water at supercritical temperature and pressure, a reactor core comprising a plurality of fuel rods in grid-like arrangement, moderator elements inserted in grid-like distribution between said fuel rods, each of said moderator elements comprising a tube, supply tube means connected to said moderator tubes for supplying at least a portion of fluid coolant to said fuel rods through said moderator tubes, groups of said fuel rods and said moderator tubes being combined into fuel element units of conventional geometric cross section, regulating valve means for controlling the reactor in addition to the control rods, said regulating valve means being connected in said supply tube means, and throttling means located in said moderator tubes.

5. In a heterogeneous nuclear reactor of pressure vessel type controlled by control rods and moderated and cooled with water at supercritical temperature and pressure, a reactor core comprising a plurality of fuel rods, in grid-like arrangement, moderator elements inserted in grid-like distribution between said fuel rods, each of said moderator elements comprising a tube, supply tube means connected to said moderator tubes for supplying at least a portion of fluid coolant to said fuel rods through said moderator tubes, said fuel rods being located substantially parallel to and spaced from one another, the control rods being displaceably received in the spaces intermediate said fuel rods, regulating valve means for controlling the reactor in addition to the control rods, said regulating valve means being connected in said supply tube means, and throttlling means located in said moderator tubes.

6. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising tube, supply tube means connected to said moderator tubes for supplying at least a portion of fluid coolant to said fuel rods through said moderator tubes, the control rods extending displaceably into the interior of said moderator tubes, regulating valve means for controlling the reactor in addition to the control rods, said regulating valve means being connected in said supply tube means, and throttling means located in said moderator tubes.

7. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, supply tube means connected to said moderator tubes for supplying at least a portion of fluid coolant to said fuel rods through said moderator tubes, the control rods being displaceably substituted for respective fuel rods in said grid-like arrangement thereof, regulating valve means for controlling the reactor in addition to the control rods, said regulating valve means being connected in said supply tube means, and throtting means located in said moderator tubes.

8. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, coolant flow channel means extending along the length of said fuel rods substantially parallel to said moderator tubes, supply tube means connected to an end of said moderator tubes and to an end of said flow channel means located opposite said end of said moderator tubes for passing to said fuel rods a portion respectively of fluid coolant through said moderator tubes and said flow channel means in counterflow directions, the fluid coolant portion passing through said moderator tubes being entrained by the fluid coolant portion flowing into said coolant flow channel means whereby the combined coolant portions pass through said coolant flow channel means along the length of said fuel rods, a mixing and collecting chamber located at the end of said fuel rods downstream from the flow of the combined coolant portions and extending across substantially the entire cross-sectional area of said reactor core, discharge outlet means from the reactor pressure vessel, said mixing and collecting chamber communicating with said discharge outlet means for discharging the spent fluid coolant, regulating valve means for controlling the reactor in addition to the control rods, said regulating valve means being connected in said supply tube means, and throttling means located in said moderator tubes.

9. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, coolant flow channel means extending along the length of said fuel rods substantially parallel to said moderator tubes, supply tube means connected to an end of said moderator tubes and to an end of said flow channel means located opposite said end of said moderator tubes for passing to said fuel rods a portion respectively of fluid coolant through said moderator tubes and said flow channel means in counter-flow directions, the fluid coolant portion passing through said moderator tubes being entrained by the fluid coolant portion flowing into said coolant flow channel means whereby the combined coolant portions pass through said coolant flow channel means along the length of said fuel rods, a mixing and collecting chamber located at the end of said fuel rods downstream from the flow of the combined coolant portions and extending across substantially the entire cross-sectional area of said reactor core, discharge outlet means from the reactor pressure vessel, superheating channels containing fuel rods and extending from said mixing and collecting chamber to said discharge outlet means for superheating said liquid coolant to vapor state and discharging said vaporized coolant, regulating valve means for controlling the reactor in addition to the control rods, said regulating valve means being connected in said supply tube means, and throttling means located in said moderator tubes.

10. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, supply tube means connected to said moderator tubes for supplying at least a portion of fluid coolant to said fuel rods through said moderator tubes, regulating valve means for controlling the reactor in addition to the control rods, said regulating valve means being connected in said supply tube means, discharge tube means in the pressure vessel of the reactor for discharging spent liquid coolant from the reactor, said supply tube means and said discharge tube means being connected in a coolant flow circuit, turbine means connected in said circuit intermediate said supply tube means and said discharge tube means, coolant flow means in said circuit for by-passing said turbine means, means for supplying fluid neutron absorber to said circuit at start-up and shut-down of the reactor, said by-passing flow means including a separating device for continuously removing the absorber from the coolant, and switch means for passing the coolant to said turbine means when the absorber has been removed from the coolant.

11. Reactor according to claim 10 including an intermediate cooler connected in said by-passing flow means for dissipating the heat in said coolant formed by the disintegration in said reactor core.

12. In a heterogeneous nuclear reactor of pressure vessel type controlled by control rods and moderated and cooled with water at supercritical temperature and pressure, a reactor core comprising a plurality of fuel rods in grid-like arrangement, moderator elements inserted in grid-like distribution between said fuel rods, each of said moderator elements comprising a tube, supply means connected to said moderator tubes for supplying at least a portion of fluid coolant to said fuel rods through said moderator tubes, regulating valve means for controlling the reactor in addition to the control rods, said regulating valve means being connected in said supply tube means, discharge tube means in the pressure vessel of the reactor for discharging spent liquid coolant from the reactor, said supply tube means and said discharge tube means being connected in a primary coolant flow circuit, at least one heat exchanger located in said primary circuit intermediate said supply tube means and said discharge tube means, a secondary coolant flow circuit including a turbine, said secondary circuit being in heat transferring engagement with said primary circuit in said one heat exchanger for heating the coolant in said secondary circuit to drive said turbine, coolant flow means in said primary circuit for by-passing said one heat exchanger, means for supplying fuel neutron absorber to said primary circuit at start-up and shut-down of the reactor, said by-passing flow means including a separating device for continuously removing absorber from the coolant, and switch means for passing the coolant to said one heat exchanger when the absorber has been removed from the coolant.

13. Reactor according to claim 12 including an intermediate heat exchanger connected in said by-passing flow means for removing from said coolant heat formed by disintegration of said fuel rods in said reactor core.

References Cited

UNITED STATES PATENTS

| | | | |
|---|---|---|---|
| 2,982,712 | 5/1961 | Heckman. | |
| 3,108,937 | 10/1963 | Kumpf et al. | 176—61 |
| 3,202,584 | 8/1965 | Bogaardt et al. | 176—61 |
| 3,203,867 | 8/1965 | Williams et al. | 176—61 |
| 3,211,622 | 10/1965 | Brown | 176—65 |
| 3,242,053 | 3/1966 | Sanders et al. | 176—65 X |
| 3,247,072 | 4/1966 | Edlund et al. | 176—92 X |
| 3,255,087 | 6/1966 | Maldague | 176—20 |

FOREIGN PATENTS

| | | |
|---|---|---|
| 1,225,589 | 2/1960 | France. |
| 1,264,217 | 5/1961 | France. |
| 1,346,663 | 11/1963 | France. |
| 820,579 | 9/1959 | Great Britain. |

REUBEN EPSTEIN, *Primary Examiner.*